United States Patent [19]
Barber

[11] Patent Number: 5,930,777
[45] Date of Patent: Jul. 27, 1999

[54] METHOD OF CHARGING FOR PAY-PER-ACCESS INFORMATION OVER A NETWORK

[76] Inventor: Timothy P. Barber, 11931 Chalon La., San Diego, Calif. 92128

[21] Appl. No.: 08/862,496

[22] Filed: May 23, 1997

Related U.S. Application Data

[60] Provisional application No. 60/043,020, Apr. 15, 1997.
[51] Int. Cl.⁶ ..................................................... G06F 17/60
[52] U.S. Cl. ................................ 705/40; 705/26; 705/27; 705/17; 380/24; 380/25; 395/200.33
[58] Field of Search ................................. 705/40, 26, 27, 705/41, 16, 17, 44; 380/24, 25; 395/200.33, 200.59

[56] References Cited

U.S. PATENT DOCUMENTS

| | | | |
|---|---|---|---|
| 5,692,132 | 11/1997 | Hogan | 705/27 |
| 5,708,780 | 1/1998 | Levergood et al. | 395/200.12 |
| 5,715,314 | 2/1998 | Payne et al. | 380/24 |
| 5,724,424 | 3/1998 | Gifford | 380/24 |
| 5,729,594 | 3/1998 | Klingman | 379/93.12 |
| 5,802,497 | 9/1998 | Manasse | 705/27 |

OTHER PUBLICATIONS

Rihaczek, Karl; "TeleTrusT–OSIS and Communication Security"; Computers and Security; vol. 6, No. 3, pp. 206–218, Jun. 1987.

Rihaczek, Karl; "Teletrust"; Computer Networks and ISDN systems; vol. 13, No. 3; pp. 235–239, 1987.

Hallam–Baker, Phillip M.; "Micro Payment Transfer Protocol (MPTP) Version 0.1" Internet Draft; pp. 1–28, Nov. 1995.

Manasse, Mark S.; "The Millicent protocols for electonic commerce"; Usenix Association; pp. 117–123, Jul. 1995.

Akashi, Osamu; Moriyasu, Kenji; and Terauchi, Atsushi; "Information Distribution by FleaMarket System" IEEE pp. 139–146, 1996.

"SubScrip—An efficient protocol for pay–per–view payments on the Internet," Andreas Furche & Graham Wrightson, Dept. of Computer, Science, U. of Newcastle, Oct. 16, 1996, pp. 1–5.

"PayWord and MicroMint: Two simple micropayment schemes," Ronald L. Rivest* and Adi Shamir**, *MIT Laboratory for Computer Science, **Weizmann Institute of Science, May 7, 1996, pp. 1–18.

"iKP—A Family of Secure Electronic Payment Protocols," IBM Research, Mar. 15, 1995 pp. 1–17.

(List continued on next page.)

*Primary Examiner*—James P. Trammell
*Assistant Examiner*—Demetra R. Smith
*Attorney, Agent, or Firm*—Ware, Fressola, Van Der Sluys & Adolphson LLP

[57] ABSTRACT

A method for charging a consumer for access, over a network, to a vendor's information; in particular, a method for this pay-per-access over the Internet. The method uses a third-party, called a banker, to mint tokens identified with particular information a consumer might want to purchase. The tokens are immediately available to the consumer because of the consumer's having already established an account with the banker, and purchased what are here called credit units, which can have a value of only a fraction of a cent, allowing vendors to charge very little for access to their information. A token is pre-authorization for a consumer to pay for access for a particular page of information. In one embodiment, when a consumer makes a purchase, i.e. chooses to access a Web page for which a vendor makes a charge, the transaction is routed through the banker, which charges in credit units (those already on account), and credits the vendor account. The vendor later redeems for payment whatever credit units have been credited to the vendor's banker account, not necessarily only those credit units resulting from transactions with a particular consumer. In another embodiment, a vendor uses a franker to test if a token is valid; this enables the vendor to collect a token from a consumer and later redeem it for payment with a banker. The method also allows for a vendor and consumer to have accounts with different bankers.

5 Claims, 5 Drawing Sheets

OTHER PUBLICATIONS

"Mini–Pay: Charging per Clickon the Web," IBM Research–Haifa Research Lab–Tel–Aviv Annex Apr. 10, 1997, pp. 1–20.

"Millicent: Frequently Asked Questions," Apr. 15, 1997, pp. 1–3.

"Millicent–specific elements for an HTTP payment protocol," Apr. 15, 1997, pp. 1–8.

METHOD OF CHARGING FOR PAY-PER-ACCESS INFORMATION OVER A NETWORK

CROSS REFERENCE TO RELATED APPLICATION

Reference is made to and priority claimed from U.S. provisional application Ser. No. 60/043,020, filed Apr. 15, 1997, entitled INTERNET PAYLINK TRANSFER METHOD.

BACKGROUND OF THE INVENTION

1. Technical Field

The present invention pertains to the field of charging a fee for information provided over a network. More particularly, the present invention pertains to a method of handling access to information over the Internet in a way that makes feasible a quite small charge per access, and does not require the consumer to have an account with the information provider.

2. Description of Related Art

Many information vendors on the Internet are accessed by consumers only once or twice for only small amounts of particular information at a time. To operate competitively, the information vendor must charge the consumer only a few cents for each access. Because of the small charge, the overhead in charging a consumer must be kept under tight control. In addition, the method used to charge for the access must verify that the consumer will pay. Early solutions to these problems relied on using a central authority to verify access, slowing down the transaction. The challenge of keeping overhead low and providing rapid access persists.

There are essentially two approaches to the pay-per-access problem: token-based and account-based. Protocols are built up around methods based on each of these approaches; a protocol, as used here, is a specific implementation of a method of charging for a consumer's access to a vendor's information.

In general, token-based methods have a consumer purchase electronic tokens from a bank. To access a vendor's information, the consumer will pay the vendor using the tokens. The vendor can then go to the bank and deposit the tokens or redeem them for money. An account-based method works like a charge-card method of paying for merchandise. A consumer authorizes a bank to transfer funds from the consumer's account to a vendor's account in exchange for receiving information from the vendor. The funds transfer is performed by the bank.

Token-based methods, compared to account-based methods, are generally considered to have the potential to achieve lower transaction costs, but do not by themselves meet the challenge of providing rapid on-line clearance. The account-based methods certainly meet the challenge of providing on-line clearance, but these kinds of methods often tend to fall short in meeting the need for rapid access at low cost.

Protocols have been proposed by credit card companies that essentially model the credit card system on the Internet. Because these methods use accounts identified by consumer name, they fail in providing another desirable characteristic: consumer anonymity. On the other hand, token-based methods have been developed that do provide consumer anonymity. However, in both the token-based methods and account-based methods developed so far, overhead is usually too high to process transactions for which only a small charge is made, and all the methods require on-line verification, which unavoidably slows a transaction.

Figure 1A:
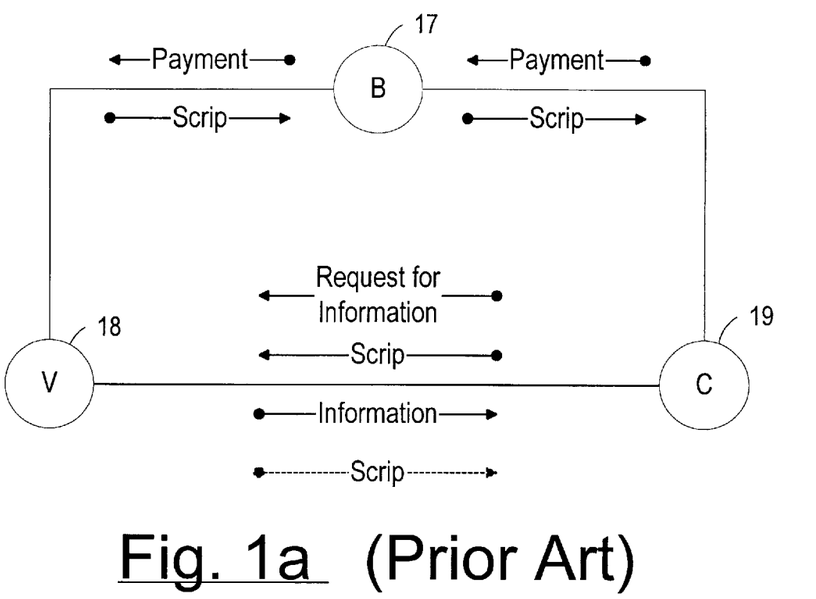
FIG. 1a is a transaction diagram for pay-per-access methods according to the prior art.

Much of the prior art, whether for an account-based or token-based method, can be understood in terms of FIG. 1a. In either kind of method, a consumer 19 first makes a payment to a broker 17 in exchange for scrip. The term scrip is used here in a generic sense to indicate a data object used in place of money. As such, the term encompasses both tokens and authorization to charge an account. The term payment is used here to indicate conveyance by a payer of money, as opposed to scrip, such as by a personal check, or authorization to charge the payer money, such as by charging a credit card owned by the payer.

With the scrip purchased from the broker 17, the consumer can purchase information from an information vendor 18. To do so, the consumer requests the information he wants using the vendor's interface, which usually indicates to the consumer the cost of the information. The vendor's interface to the consumer will take scrip for the amount charged for the information, and send the consumer the information. Finally, the vendor will redeem for payment from the broker the scrip the vendor has collected. The vendor may of course make the redemption at a later time so as to redeem scrip from multiple users.

This model is easily applied to token-based methods, and in these methods there is sometimes one additional exchange: the vendor may make change, returning scrip to the consumer equal to the amount tendered less the amount charged. But the model also applies to account-based methods. In these methods, the scrip is usually simply credit-card information, and the broker is a credit card company. The difference is that in account-based methods, a consumer's use of scrip to pay for information is actually the exercise of a pre-approved loan.

In all of these methods, the information vendor and the consumer interface directly in the pay-per-access transaction; i.e. the consumer sends a request for particular information with scrip to pay for it, and the vendor provides the information. In doing this, the vendor ensures that the scrip is authentic by checking that the consumer has an account adequate to back the scrip. This requires either that the consumer have an account with the vendor, or that the vendor get clearance to accept the scrip from a central authority. There are three obvious difficulties with such approaches: either a consumer must have a lot of accounts, one with each vendor; or a central authority must be used for each purchase, slowing the access and raising the transaction cost; or, finally, every vendor must develop the capability of handling scrip, which may slow access, depending on what the vendor must do with the scrip.

What is still needed is a method of charging for each access in a way that is secure but fast, and that keeps overhead low. One way to do this is to involve the vendor as little as possible. The interactions that keep costs high or slow access are those needed to ensure that a consumer's scrip is bona fide.

SUMMARY OF THE INVENTION

The method of the present invention uses a third party, called here a banker, as an agent for collecting a fee from a consumer for browsing information provided over a network by a vendor. Before a consumer can request access to a page of information, the banker, after verifying that the consumer has credits on account to pay for the information, mints a token that the consumer can use to pay for the information. The token can be used only by the particular consumer, for a particular page of information. The banker keeps from the consumer the network location of the information until the consumer returns the token in exchange for the information.

In one embodiment of this method, the interaction between vendor and consumer is limited to the consumer retrieving the vendor-provided information from the vendor after the banker provides the consumer with the search data required to retrieve the paid-for information. The banker manages all other transactions needed to pay the vendor for the information provided. This method is particularly suitable where the network includes the Internet, and where the banker provides the required search data to the user's Internet browser.

To make the information available for a charge, the vendor creates a top commerce (Web) page having links to Web pages the vendor wants to sell, and to any lower-level commerce pages linked to the top commerce page. Each link uses an address to point to a lower-level Web page. Next, for each link on each commerce page, the vendor adds a field that indicates the charge for accessing the linked Web page. Each of these links, now bearing a price for the linked Web page, is called here a priced link.

To introduce the consumer to the top commerce page, the vendor also creates a front door. The front door is a Web page that has an entry link, i.e. a link that ultimately accesses for the consumer a personalized copy of the vendor's top commerce page, giving the consumer access to the pay-per-access Web pages linked directly to the top commerce page, or linked indirectly through lower-level commerce pages that are themselves linked to the top commerce page.

By exercising an entry link, such as by clicking on it, a consumer is connected to the banker, but kept from learning the secret the address of the top commerce page (at the vendor Web site). Exercising the entry link prompts the banker to create a personalized copy of the commerce page, and to provide it to the consumer. Before providing the personalized copy of the commerce page to the consumer, however, the banker alters each priced link by redirecting it to point to the banker, instead of to the vendor, and by attaching a token to it. The priced link is then said to be tokenized. Each token conveys all the information the banker needs to both provide the consumer with, and charge the consumer for, the pay-per-access information associated with the tokenized link.

The method of the present invention is not confined to a particular protocol; for example, it is not limited to a particular set of modifying fields, nor is it limited to a particular manner of embedding fields in an Internet address. In addition, the method of the present invention is not confined to use on the Internet. The essential concept, that of a third-party for minting secure tokens for particular pay-per-access transactions, has general utility, and can be implemented in many ways and for many different applications, as will become apparent to one skilled in the art.

It is an object of the present invention to provide a means of pay-per-access that requires no additional software or hardware for either vendors or consumers.

It is a further object of the present invention to provide pay-per-access in a way that can be implemented without using hypertext commands, electronic wallets, bank cards, or other plug-ins or hardware.

It is further an object of the present invention to provide tokens that are minted only as needed and are good only for a specific transaction in a specific time frame.

It is another object of the present invention to provide a method that permits any facility to become a banker, i.e. to create a market without artificial barriers to entry, so that the number of bankers and the capacity of existing bankers can expand and shrink to accommodate market demand, and each banker can compete with the others for consumer accounts by offering different services in addition to the primary service of managing pay-per-access transactions.

It is also an object of the present invention to keep overhead in charging for access low enough that charges as small as ⅒th of a cent are feasible.

It is another object of the present invention to provide a pay-per-access method in which the consumer's identity can be traced only through the banker.

It is another object of the present invention to provide active measures that prevent a vendor from tricking a consumer into paying more for a link than the consumer believes he is paying.

It is a further object of the present invention to provide pay-per-access requiring no public key technology, or other patented or unexportable cryptography.

It is another object of the present invention to provide pay-per-access enabling automatic content screening so that a consumer can block access to inappropriate information from the consumer's network location, by, for example, the consumer's children.

BRIEF DESCRIPTION OF THE DRAWINGS

The above and other objects, features and advantages of the invention will become apparent from a consideration of the subsequent detailed description presented in connection with accompanying drawings, in which.

BEST MODE FOR CARRYING OUT THE INVENTION

The preferred embodiment of the present invention is as a method for paying for information at a Web site of the World Wide Web (WWW), accessed over the Internet.

Some Terminology

In this description, a document is a page of information that a vendor charges to access; a document is located at a Web site, usually that of the vendor charging for access to the document. A page at a Web site can bear information for which a charge is made, or can serve other purposes, such as presenting to a consumer a menu from which to select a document. A consumer is one who views a document on the World Wide Web, called the Web from here on, by accessing the document over the Internet. A link is a part of a document that a consumer can click on, i.e. exercise, to access a related document. A tokenized link is a link that when clicked on causes not only the linked document to be displayed to the consumer, but also results in the consumer being charged a fee for the document, and the vendor being paid a fee. The fee is paid by the consumer in credit units; the vendor is paid with money; here, the term credit units is used in a generic sense to indicate a data object representation of money, i.e. a kind of scrip. However, a consumer uses a token to convey credit units.

Tokens, which are data objects having a specific value in credit units, are minted by a banker for use in purchasing access to a particular Web page, charging an account of a particular consumer and crediting an account of a particular vendor, usually the vendor that owns the Web page. A banker is any Web-based authority that mints tokens using a protocol based on the present invention and exchanges spent tokens for credit units, which can then be exchanged for ordinary money. A commerce page is a page that includes one or more tokenized links. A tokenized link is a link with an embedded token; exercising a tokenized link, by for example clicking on it, uses the token, which results in access to the particular information for which the token was minted. There is no charge for accessing a top commerce page, i.e. the commerce page uppermost in the vendor's linked hierarchy of pages grouped for a pay-per-access service.

In addition to the terminology specific to the present invention, this description uses some standard terminology associated with Web documents and transport protocols. Hypertext markup language (html) is a format used by most documents on the World Wide Web. A uniform resource locator (URL) is a Web address, which uniquely identifies the location of a particular document (information-bearing page) on the network. A hypertext transfer protocol (http) is the standard protocol used to retrieve and view Web documents. A common gateway interface (cgi) is a Web object that when referenced executes a program at a destination address, and returns some data or a program-generated html document. An extended URL (also called a cgi-extended URL) is a Web address that is said to be extended because of having data used as input by a cgi program at a destination address. An example of an extended URL is http://www.site.com?data=3991772391.

Setting Up Accounts

Figure 1B:
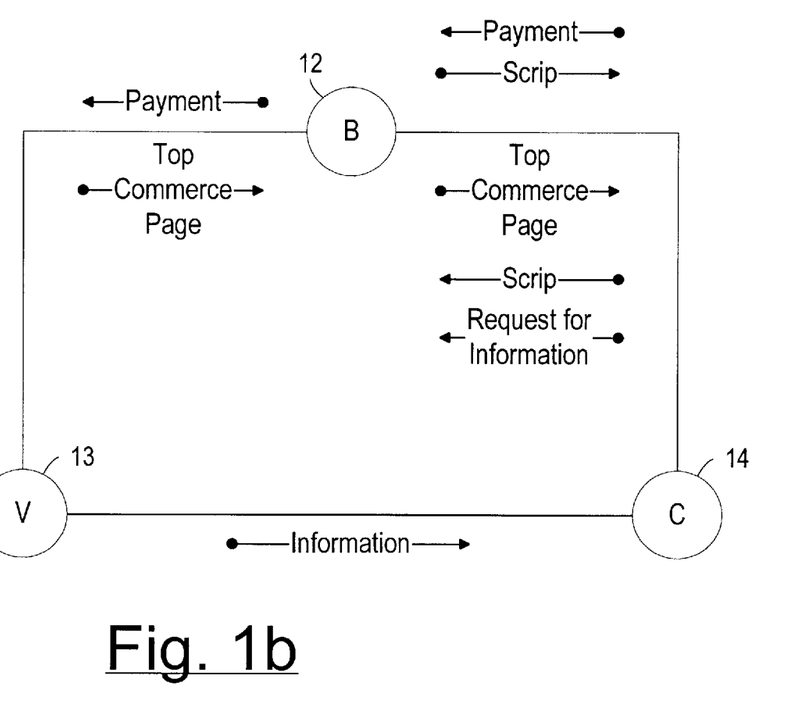
FIG. 1b is a transaction diagram for a pay-per-access method according to the present invention.
Figure 2:
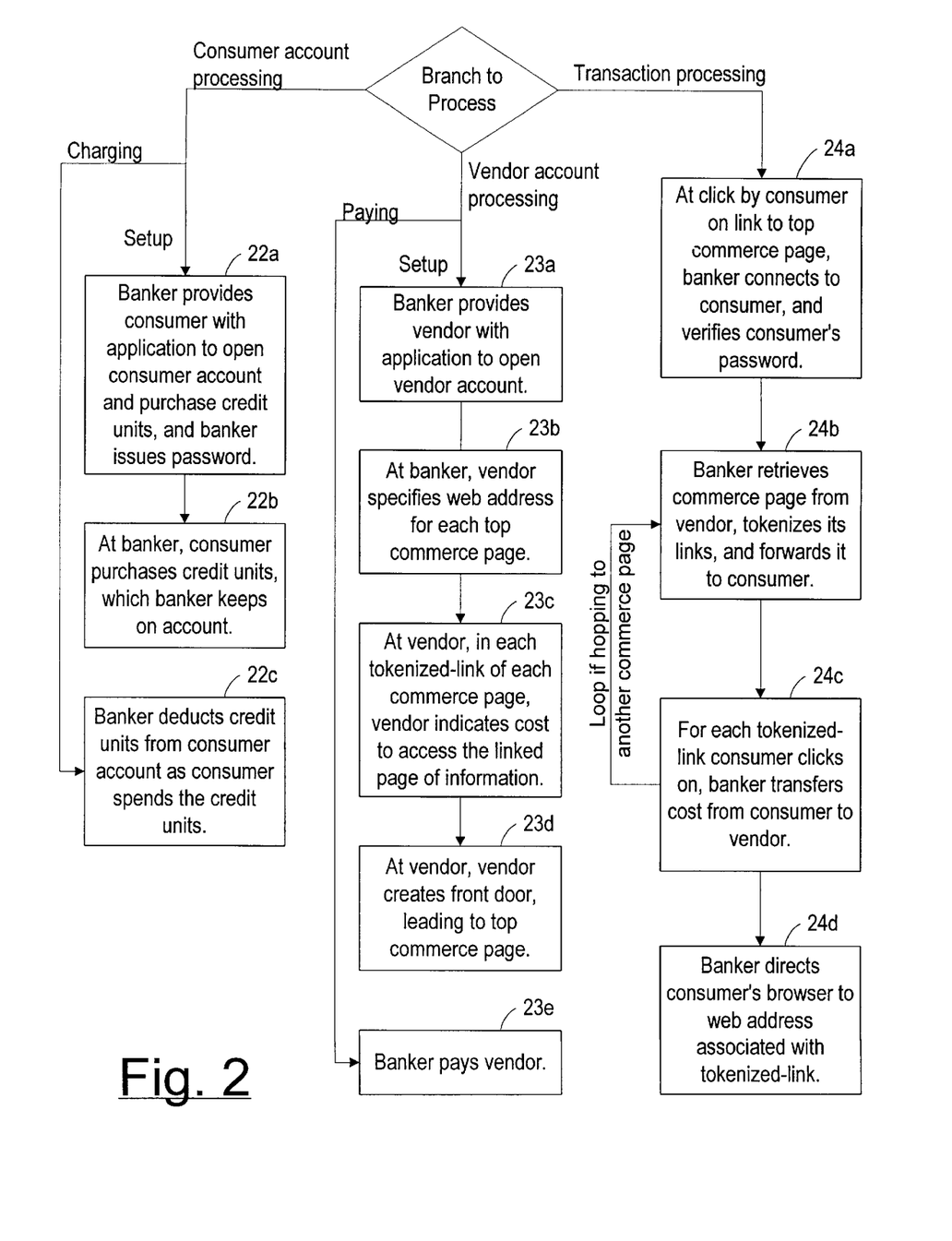
FIG. 2 is a process flow diagram for a pay-per-access method according to the present invention.

Referring now to FIG. 1b and FIG. 2, a consumer 14 establishes an account with a banker 12, receiving a consumer password so that the banker can positively identify the consumer (step 22a of FIG. 2). To open the account, the consumer visits the banker Website, and uses a credit card, for example, to purchase credit units according to some exchange rate geared to allow one credit unit to be worth a fraction of a monetary unit, e.g. a fraction of a U.S. penny (step 22b of FIG. 2). The purchased credit units are then kept by the banker in an account for the consumer. In another embodiment, the consumer could be given credit, instead of being required to purchase a specific number of credit units; then the consumer could be billed later for credit units expended.

An information vendor 13 also opens an account with the banker 12 by visiting the banker Website (step 23a of FIG. 2). When the vendor opens an account, the banker provides the vendor with an identification the banker can later use to positively identify the vendor. After opening an account, the vendor can make information available to consumers for a charge for each access collected by the banker at the time of access. To allow for this, the vendor specifies the Web address of a Web page he will use as a top commerce page, which includes tokenized links to the pages the vendor wants to sell access to (step 23b of FIG. 2). The banker issues the vendor a page-ID for the top commerce page so that the top commerce page can be publicly referenced later without revealing its actual Web address (which is at the vendor's Website).

Embedding Tokenized Links

After establishing an account at a banker, a vendor places in the Web page to be used as a top commerce page one or more links each pointing to a pay-per access page and conveying a cost for access (step 23c of FIG. 2). Although other syntax is possible, in the preferred embodiment an ordinary html Web page is made into a commerce page by appending a cost field to a link. For example, if the commerce page has a link, http://www.vendor.com/news.html then for it to be parsed as a priced link costing 71 points, the vendor would change the link to http://www.vendor.com/news.html?cost=71.

In other syntax, the cost field might be added at places other than the end of a link; the only limitation is that the link be parseable.

With the addition of the cost field to a link, the Web page with the link becomes a commerce page, and the link becomes a priced link. Until it is later tokenized by a banker, a priced link points directly to the pay-per-access page at the vendor's Web site. The vendor might also place priced links in lower-level Web pages, making those pages both commerce pages and pay-per-access Web pages. These lower-level commerce pages would then point to information-bearing pages even lower in the linked hierarchy set up by the vendor. If the vendor wants, a lower-level commerce page can serve only as a menu, instead of also bearing pay-per-access information, and the vendor can set the charge to access the lower-level menu-only commerce page to zero (as indeed the charge for any Web page can be set to zero).

Creating a Front Door

The vendor must also create a Web page the consumer can access as a front door to the vendor's store of pay-per-access Web pages (step 23d of FIG. 2). The front door leads to a top commerce page, and is needed because the address of the top commerce page must be kept secret from the public, forcing access through a banker. The vendor does this simply by creating a Web page with a link that directs a consumer to a banker, which enables the banker to then prepare a personalized copy of the commerce page for the consumer. For example, to direct a consumer, through a banker, to a vendor's commerce page assigned pageid equal to 51391009 by the banker, the vendor could edit an ordinary link, making it the (cgi-extended URL) entry link:

http://www.banker.com/commerce?pageid=51391009.

Here, commerce is a cgi program, at the banker Web site, that executes when the consumer clicks on the entry link; commerce uses pageid=51391009 as a parameter. The program commerce will tokenize the links of the top commerce page, in the sense explained below, enabling the consumer to purchase information by exercising the tokenized links.

Preparing a Commerce Page for a Consumer

Figure 3:
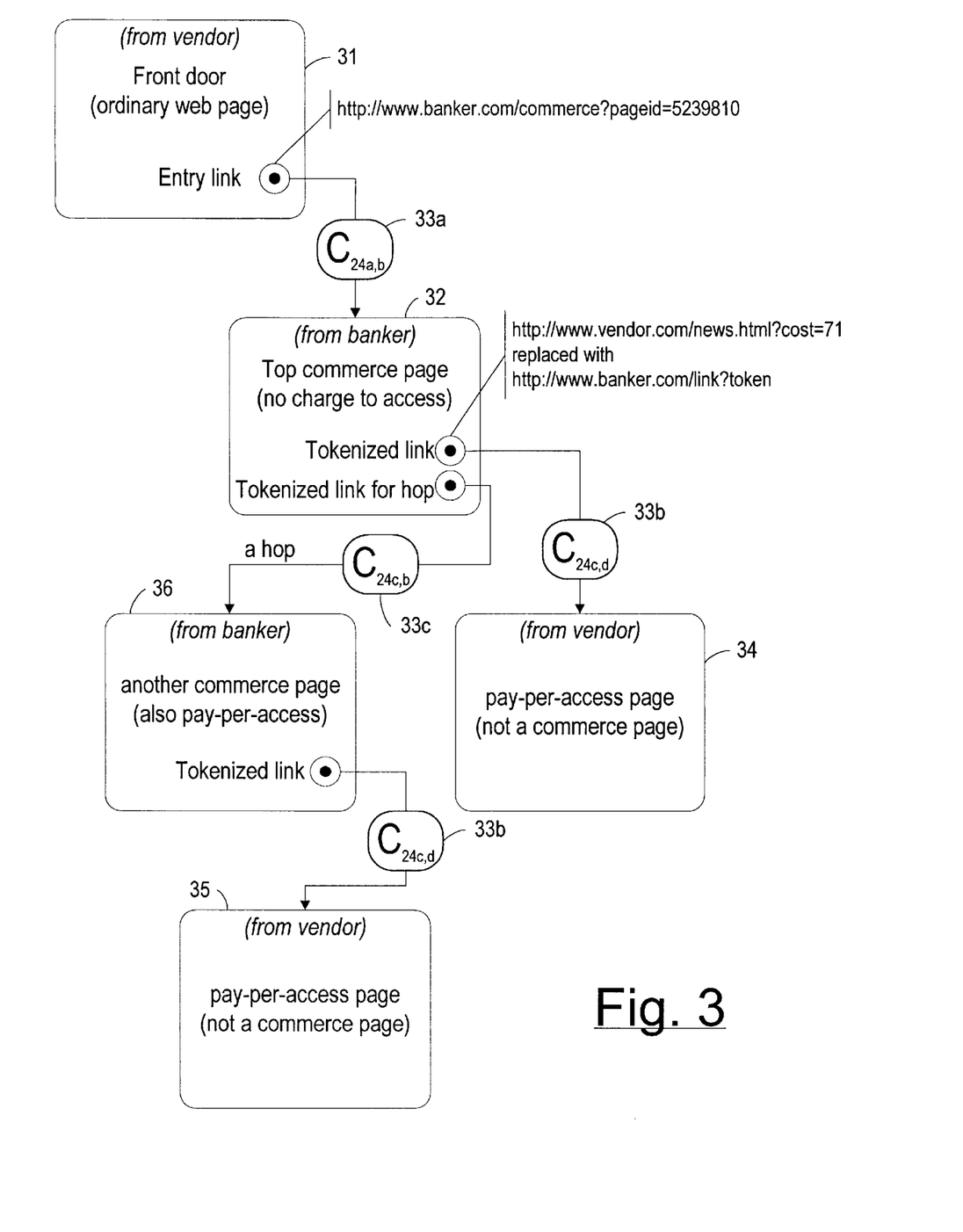
FIG. 3 is a representation of linked pages on the World Wide Web, showing ordinary links and tokenized links.

Referring now to FIG. 3 and also to the transaction processing branch of FIG. 2, a pay-per-access begins when a consumer clicks on an entry link of a front door Web page 31, causing execution of a secure program at a banker 33a with a parameter that the banker uses to both look up the address of the commerce page to access, and to identity the vendor (step 24a of FIG. 2). (The symbol $C_{24a,b}$ of 33a of FIG. 3 indicates the banker is performing steps 24a and 24b of FIG. 2.) The secure program advises the consumer that the page being accessed includes priced links, and requests the consumer's bank account password. For convenience, the consumer's bank account password could be entered automatically using a browser plug-in program, although this is not necessary.

After the banker 33a verifies the consumer's bank account password, it looks up the secret address of the commerce page, and retrieves a copy of the commerce page, either a fresh copy via ftp/http/https, or a cached copy. Next, it tokenizes all priced links on the commerce page, which readies these links for use by the consumer (step 24b of FIG. 2). To tokenize a link, the banker computes a token for the transaction associated with the priced link, and replaces the priced link with a link that instead sends the token to the banker for processing. For example, the priced link, http://www.vendor.com/news.html?cost=71 would be replaced with http://www.banker.com/link?token, where token is a data object banker uses to charge a consumer and credit a vendor account for a pay-per-access. A token is computed as described below in a way that encodes several items of transaction-related information, including at least the amount the consumer should be charged for the information, the consumer identification, the vendor identification, and the address of the destination pay-per-access Web page.

After tokenizing the priced links on the commerce page, the secure program forwards the commerce page to the consumer; this transfer can advantageously be done via https. Throughout all this the network location of the commerce page remains hidden, because the document was forwarded from the banker. Also, at no point thus far has there been a charge to the consumer, because the consumer has yet to exercise a tokenized link; the consumer has so far clicked only on the entry link. Upon viewing the top commerce page, the consumer may decline to purchase any information from the vendor, and there would then be no charge to the consumer.

Making a Sale

With tokens embedded in links on a commerce page, if a consumer clicks on one of the tokenized links, the banker will decipher the embedded token. In one embodiment of the present invention the token may include, among other fields, a signature indicating that the token was in fact issued by the banker, a time-stamp verifying that the token is not too old according to some predetermined allowable time period for using the token, and the number of credit units charged for the information. After deciphering the token, which will provide the banker with all data needed to handle the transaction for which the token was computed, the banker will direct the consumer's browser to the information-bearing, paid-for Web page at the vendor's site. In deciphering a token, the banker examines it for tampering and obsolescence (a token is issued to be good for only a short time), and then extracts the transaction data it needs for charging the consumer account and crediting a vendor account (usually the vendor who owns the information-bearing Web page being accessed).

In another embodiment, the banker protects the consumer by modifying the commerce page to indicate precisely which links are tokenized links by adding a price tag image to each hyperlink that is in fact a tokenized link.

In the case of linking from a commerce page 32 (FIG. 3) to another commerce page 36, after performing step 24c (FIG. 2) the banker will restart transaction processing according to step 24b, retrieving the commerce page, authorizing all the valid tokenized links, and forwarding the page to the consumer. In linking to a pay-per-access page 34 from commerce page 32, since there are no tokenized links on the pay-per-access page, the banker 33b will perform first step 24c of the transaction processing branch, i.e. it will transfer the cost from the consumer to the vendor, and then step 24b, directing the consumer's browser to the Web address associated with the tokenized link.

More Commerce Page Syntax

By default, revenue for all tokenized links goes to the vendor identified by the pageid for the top commerce page. However, a vendor could indicate that payment be directed to another vendor by simply adding a vendor field, as for example in:

http://www.vendor.com/news.html?cost=71&vendor=6610012.

Here the standard syntax is used for extending URLs. The question mark character "?" precedes the data, and data items are separated by the ampersand character "&". Other fields used in the preferred embodiment are shown below in Table 1.

TABLE 1

Fields available to a vendor for use in tailoring a tokenized link

| Field | Description |
|---|---|
| cost | cost of a link in credit units |
| vendor | identification of vendor to be credited |
| hop | indicates a link leading to another commerce page, a kind of link requiring, in one embodiment, that the identities of the consumer and vendor be preserved |
| resell | specifies a percentage of each tokenized link transaction a vendor will pay as a commission to another vendor who refers a consumer to a top commerce page |
| reseller | specifies the vendor identification of the referring vendor |
| suitability | indicator of suitability for children |
| reverse | indicates that the direction of the transaction should be reversed, i.e. that the transfer of credit units at the banker is to be from the vendor to the consumer (used for granting refunds) |

Computing Tokens

According to the present invention, a token is a data object used by banker to charge a specific consumer for accessing a specific Web document for a specific charge. In the preferred embodiment, a token includes the data fields shown in table 2, where the period "." indicates concatenation of the strings that are the values of the different fields.

TABLE 2

Data fields included in a token

| Field | Description |
|---|---|
| time | seconds since jan. 1, 1970 (standard UNIX timestamp) |
| consumer | consumer account number |
| vendor | an identification of a referring vendor |
| cost | cost for the access (in terms of credit units) |
| target | address of document to be accessed (enciphered) |

From these data fields, the banker constructs a concatenated transcode field:

transcode=time.consumer.vendor.cost.target

In addition to the data fields, a token includes a control variable globalCV, which is, in the preferred embodiment, a 64-hexadecimal-digit, private cryptovariable provided by the vendor's banker. With the control variable and the data fields, the banker constructs a 64-hexadecimal-digit, public signature of the token, according to:

signature=hash(transcode.globalCV)

where hash ( ) indicates any irreversible encipherment algorithm, i.e., any procedure that computes a digital signature for a document so that tampering can be detected. Finally, the banker computes the token by concatenating the signature with the transcode according to:

token=transcode.signature.

If a vendor places other data fields in a link, such as hop or resell, they are also included in the transcode.

When a Consumer Account Falls Short

In the preferred embodiment, whenever a consumer exercises a particular tokenized link on a commerce page, and then backs up from the linked page to the same commerce page, the banker refreshes the commerce page by again tokenizing the links. That way the consumer can be charged again for re-accessing the same information.

If some of the tokenized links on a commerce page cost more than the consumer has on account, but the consumer can afford some of the other tokenized links, the banker will mint the tokens the consumer can pay for. If, after accessing a pay-per-access page, the consumer backs up to the same commerce page, the banker will again tokenize the links according to the same procedure as before.

When a Consumer and Vendor Use Different Bankers

Figure 4A:
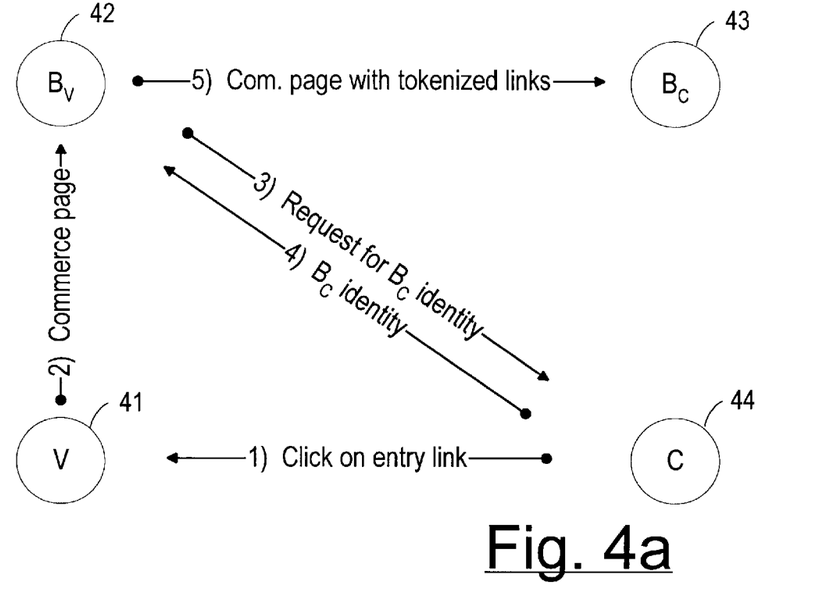
FIG. 4a and FIG. 4b illustrate an aspect of the method of the present invention in a case where a consumer and a vendor have accounts with different bankers.
Figure 4B:
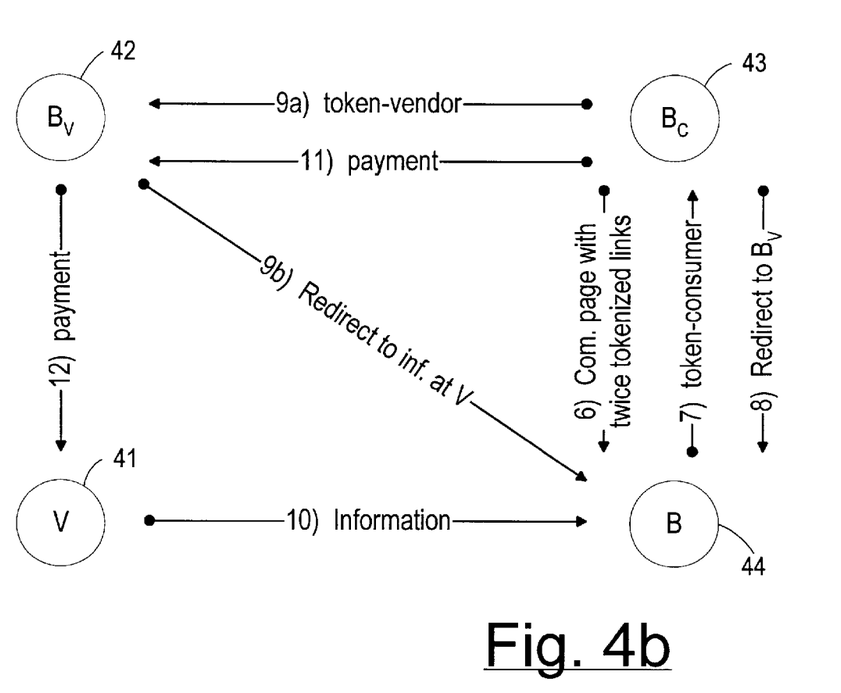

Referring now to FIGS. 4a and 4b, when a consumer 44 and vendor 41 have accounts at different bankers, the consumer's banker 43 and the vendor's banker 42 cooperate in enabling the consumer to access the vendor's information. After the consumer clicks on an entry link at the vendor's Web site, the vendor's banker retrieves a copy of the vendor's top commerce page and attempts to tokenize its priced links. When the vendor's banker discovers that the consumer does not have an account with it, it asks the consumer what banker to use. Assuming the consumer has an account with some other banker, the consumer provides the vendor's banker with account information the consumer has with another banker. The vendor's banker then tokenizes the priced links on the top commerce page and forwards the page to the consumer's banker. The consumer's banker then also tokenizes the now already once tokenized links.

In other words, the vendor's banker takes a priced link from the top commerce page, such as http://www.vendor.com/news.html?cost=71 and replaces it with a token it computes, so that it becomes, for example, http://www.banker-vendor.com/link-vendor?token-vendor, where token-vendor includes the un-enciphered cost (in credit units) in its transcode element, so that the consumer's banker can read the cost. The vendor's banker then forwards the commerce page to the consumer's banker, which then replaces each once-tokenized link with a link bearing a token the consumer's banker mints. Such a doubly-tokenized link could look like, http://www.banker-consumer.com/link-consumer?token-consumer, in which token-consumer encapsulates the token minted by the vendor's banker.

After tokenizing each link on the commerce page, the consumer's banker forwards it to the consumer. This enables the consumer to exercise a tokenized link, by clicking on it for example, prompting the consumer's banker to process (unwrap) the token it minted, charge the consumer and credit the vendor's account, and then redirect the consumer to the vendor's banker. In redirecting the consumer to the vendor's banker, the consumer's banker conveys to the vendor's banker the token minted by the vendor's banker. The vendor's banker unwraps its token, and, based on the fields the token contains, redirects the consumer's browser to the now paid-for information. At the same time, the vendor's banker will credit the vendor's account for the access. Later, it may withdraw from its account with the consumer's banker the credit units deposited there by the consumer's banker when the consumer's banker charged the consumer for the access.

An Embodiment Where the Vendor Collects Tokens

Figure 5:
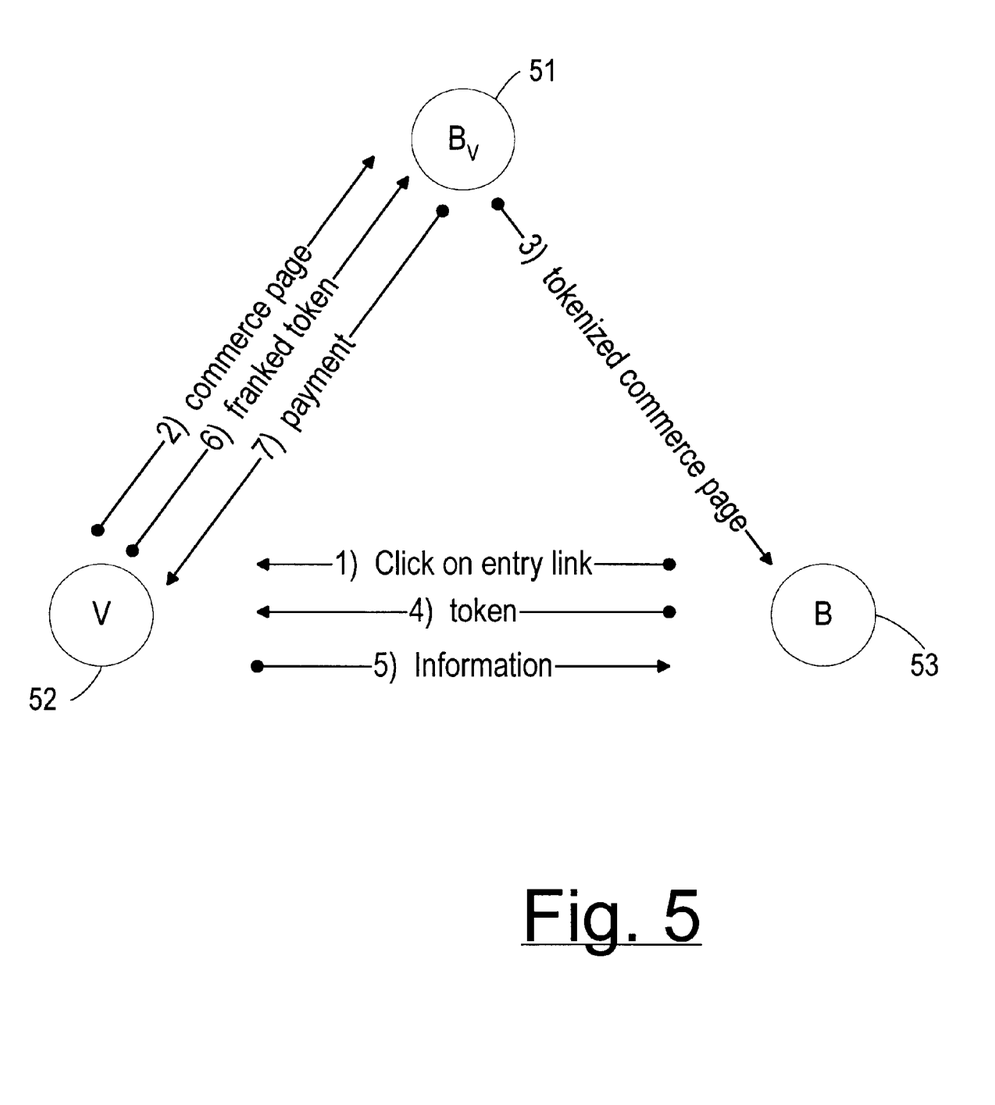
FIG. 5 is an illustration of an aspect of the method of the present invention in a case where a vendor collects tokens directly from a user.

Referring now to FIG. 5, in another embodiment of the present invention, a vendor 52 collects tokens from a consumer 53, instead of a banker collecting the tokens. A banker entity 51, which might be both the vendor's banker and the consumer's banker acting in cooperation as explained above, only mint the tokens for a commerce page, embed them in the commerce page, and provide the commerce page to the consumer. In this embodiment, the location of the vendor's information is still kept secret from the consumer until the consumer pays for the information using a token.

To prepare the vendor to accept tokens, the banker entity 51 provides the vendor with franking software and a 64-bit vendor cryptovariable, specific to the vendor. When the consumer 53 exercises a tokenized link, the vendor 52 franks the token, i.e. tests to determine if the token is counterfeit. If the token is bona fide, the vendor deciphers the token to determine the location of the information the token buys, redirects the consumer to the information, and stores the token so that it can redeem it later with the banker entity.

In the preferred embodiment of implementing this aspect of the invention, two additional fields are used in computing tokens; they are shown in table 3.

TABLE 3

Data fields included in a token to be collected by a vendor

| Field | Description |
|---|---|
| vendorCV | 64 random bits, a cryptovariable used to identify a vendor to a banker |
| mtarget | target enciphered using vendorCV |

In tokenizing a priced link, in place of token computed as described above, a banker would use mtoken=token.mtarget.msignature where msignature=hash(token.vendorCV).

In addition, the banker would change the URL of the link so that the token is delivered to the vendor's franking program, instead of to the banker. In the case of hops, however, the banker-directed format described above is used for tokenizing a priced link, not this vendor-directed format. In this embodiment a vendor can now frank arriving tokens, extract the network location of the information purchased by the token, and redirect the consumer to the information. This franking is accomplished without breaching token integrity, without resort to public-key operations, and without involving a banker.

All of the embodiments disclosed here rely on the core feature of the present invention—using a third-party as a toll-gate to control access by a consumer to a vendor's information. It is to be understood that the above-described arrangements are only illustrative of the application of the principles of the present invention. Numerous modifications and alternative arrangements may be devised by those skilled in the art without departing from the spirit and scope of the present invention, and the appended claims are intended to cover such modifications and arrangements.

What is claimed is:

1. A method of charging a consumer for access, over a network, to at least one page of information provided by a vendor at a network site, the method using a third-party acting as a banker for transferring funds associated with said charging from the consumer to the vendor, the consumer having a quantity of credit units on account with the banker, the vendor having an account with the banker for holding credit units that the banker collects from consumers, the vendor having a page accessible over the network to the public that includes a link to a program at the banker and a parameter for the program, the parameter for identifying another network page of the vendor in a way that enables the banker to access a copy of the other network page, the other network page having links to lower-level pages that the vendor charges consumers to access, the method executed when a consumer exercises the link on the page accessible to the public, the method comprising having the banker obtain a copy of the other network page of the vendor, and alter on the page the links to lower-level pages, the links to the lower-level pages indicating a charge in credit units for access to each linked page, said altering including the steps of:

a) minting a token for each page of linked information, the token encoding all of the data the banker needs to charge the consumer for accessing said linked page of information;

b) redirecting each link to the banker site and embedding in each redirected link the token for the linked information; and    c) also embedding in each redirected link instructions for the banker that if the consumer clicks on one of the links, the banker is to execute a program for charging the consumer account for the access in credit units, crediting the vendor account, and directing the consumer to the linked information without identifying to the consumer the network location of the linked page of information,    whereby the consumer accesses a page of linked information only after paying for the information with a token, and without learning the network location of the linked page of information.

2. A method as claimed in claim 1, further comprising the step of determining which pages of information the consumer has enough credit units on account to pay for.

3. A method as claimed in claim 1, wherein the third-party comprises a banker holding an account of the vendor and a different banker holding an account of the consumer, wherein the vendor's banker has an account with the consumer's banker, wherein the altering, on the other network page of the vendor, the links to lower-level pages is performed first by the vendor's banker, creating once-altered links, and wherein the method further comprises the steps in which the consumer's banker:

a) determines which pages of information the consumer has enough credit units on account to pay for;

b) mints a token for each page of linked information, the token encoding all of the data the consumer's banker needs to charge the consumer for accessing said linked page of information;

c) redirects each link to the consumer's banker site and embeds in each redirected link the token for the linked information; and    d) also embeds in each redirected link instructions for the consumer's banker that if the consumer clicks on one of the links, the consumer's banker is to execute a program for charging the consumer account for the access in credit units, crediting the vendor's banker's account, and directing the consumer to the vendor's banker.

4. A method as claimed in claim 1, wherein, when the consumer exercises a link to a lower-level page requiring a token to access, the vendor's banker collects the token from the consumer, determines if the token is valid, and, if so, directs the consumer to the lower-level page.

5. A method as claimed in claim 1, wherein, when the consumer exercises a link to a lower-level page requiring a token to access, the vendor collects the token from the consumer, determines if the token is valid, and, if so, directs the consumer to the lower-level page.

* * * * *